United States Patent [19]

Lainez et al.

[11] 4,084,694
[45] Apr. 18, 1978

[54] CONTAINER FOR VIDEO DISCS

[75] Inventors: Lucien Lainez; Bernard Fichot; Jean-Paul Bijon, all of Paris, France

[73] Assignee: Thomson-Brandt, Paris, France

[21] Appl. No.: 720,657

[22] Filed: Sep. 7, 1976

[30] Foreign Application Priority Data

Sep. 11, 1975 France .................................. 75 27928

[51] Int. Cl.² .............................................. B65D 85/30
[52] U.S. Cl. .................................. 206/444; 206/313; 211/40
[58] Field of Search ................ 206/444, 307, 309–313; 211/40

[56] References Cited

U.S. PATENT DOCUMENTS

| 2,866,541 | 12/1958 | Ravis | 206/313 |
| 3,526,884 | 9/1970 | Buslik | 206/444 |
| 3,864,755 | 2/1975 | Hargis | 206/313 |
| 3,942,639 | 3/1976 | Cournoyer | 206/444 |
| 3,951,264 | 4/1976 | Heidecker | 206/444 |

FOREIGN PATENT DOCUMENTS 21,099 of 1907 United Kingdom .................. 206/313

*Primary Examiner*—William Price
*Assistant Examiner*—Douglas B. Farrow
*Attorney, Agent, or Firm*—Cushman, Darby & Cushman

[57] ABSTRACT

A container for video-discs includes a support for the disc and a protective envelope which is open along one edge to allow the support to be inserted laterally into the envelope. The container comprises furthermore guiding means for centering the video-disc on the support, and means for engaging the support for its handling and insertion means arranged at one end of the support to allow its sliding into the envelope.

8 Claims, 18 Drawing Figures

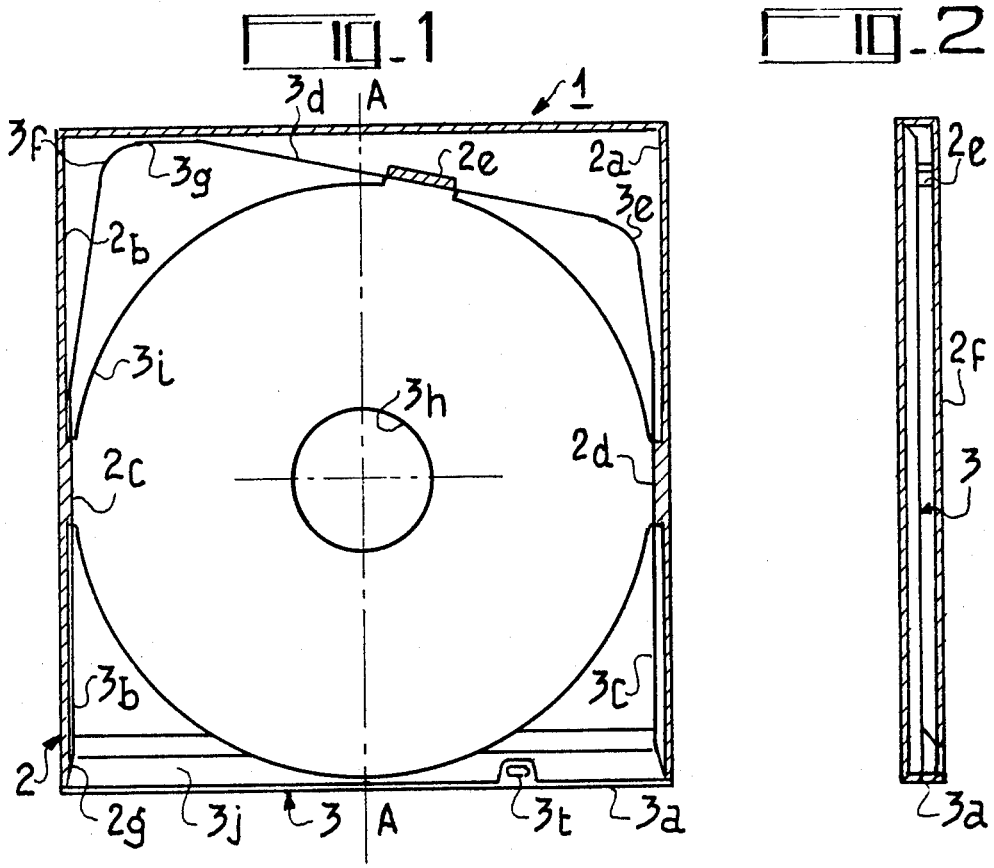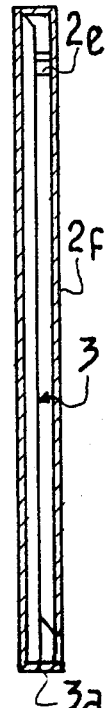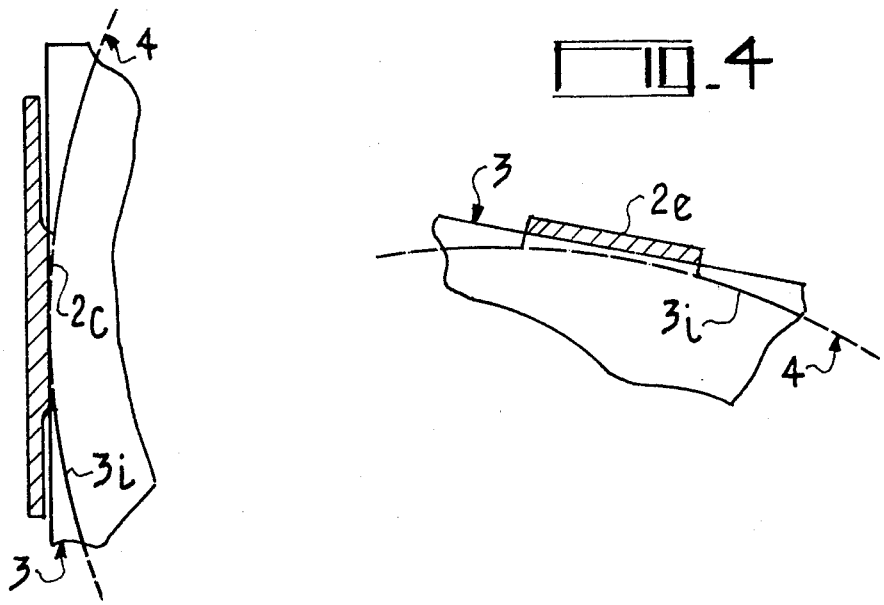

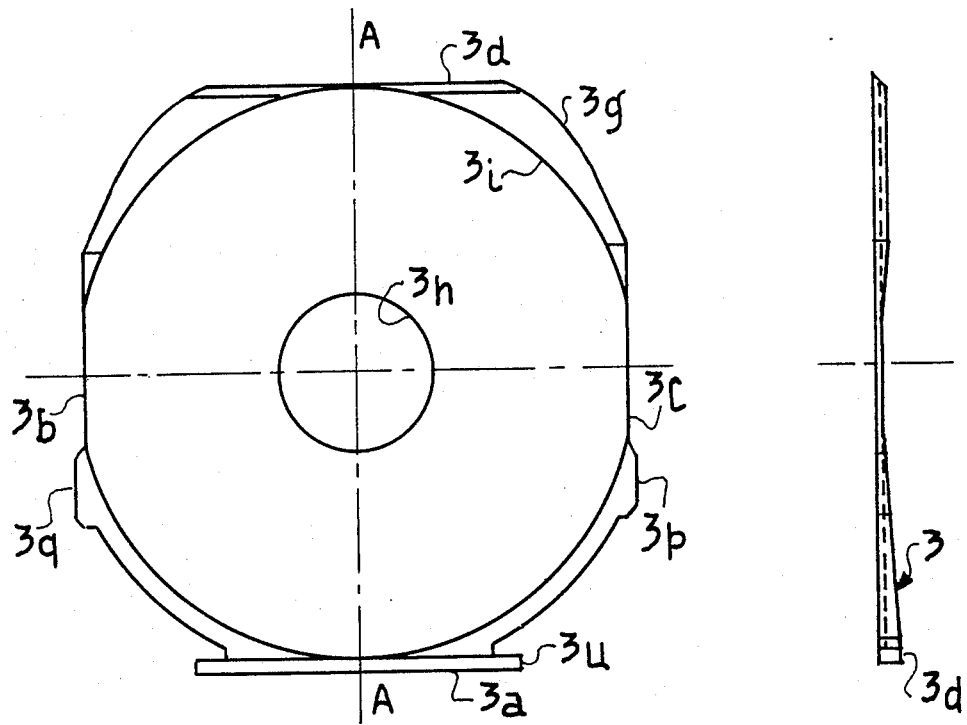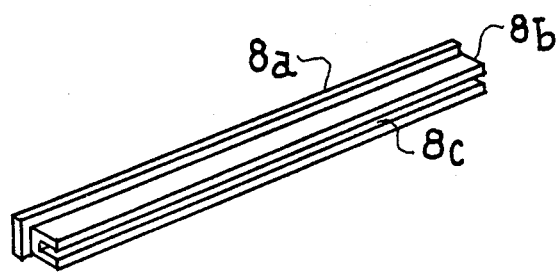

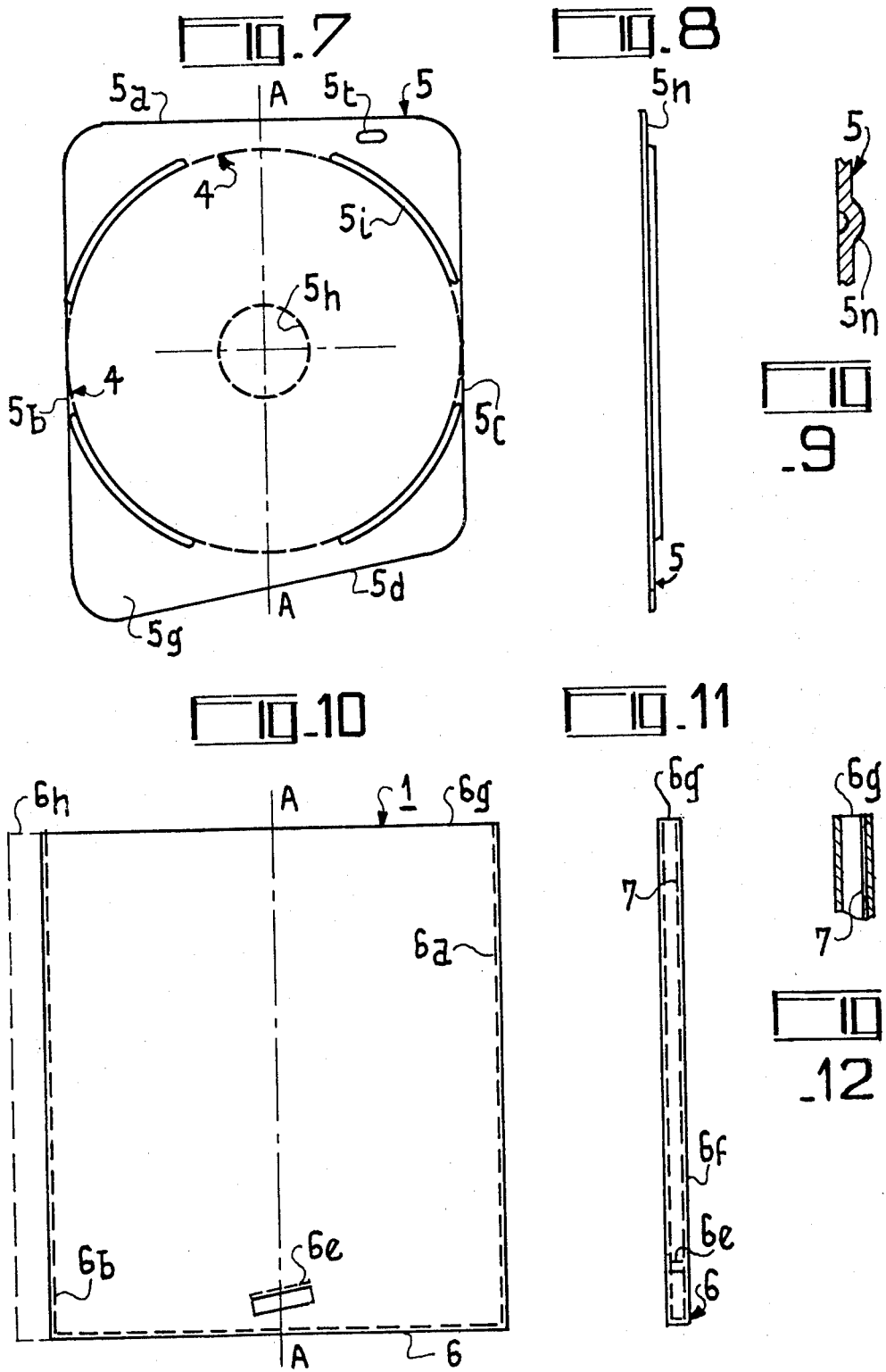

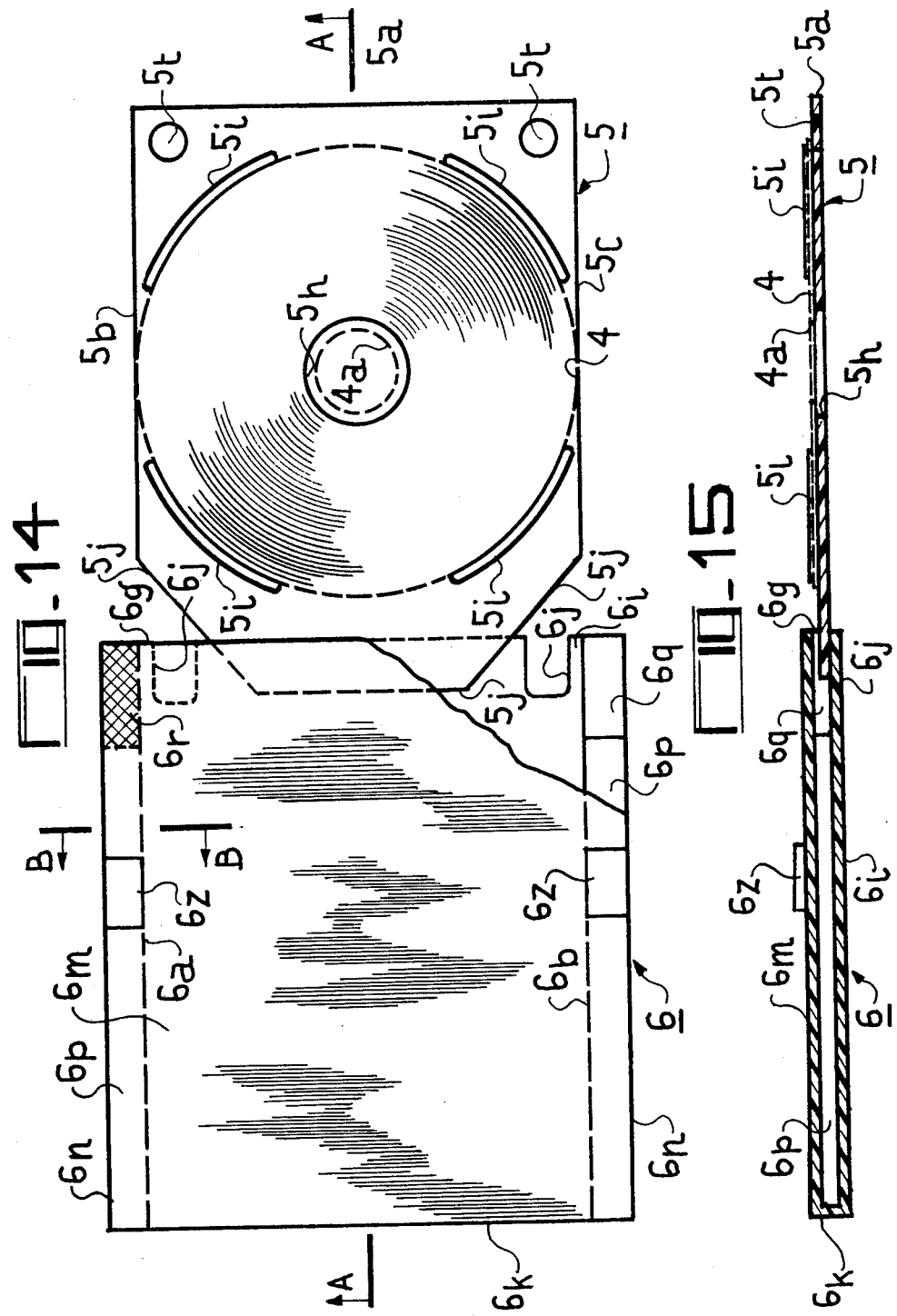

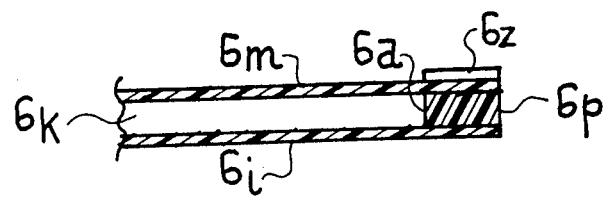
FIG_16
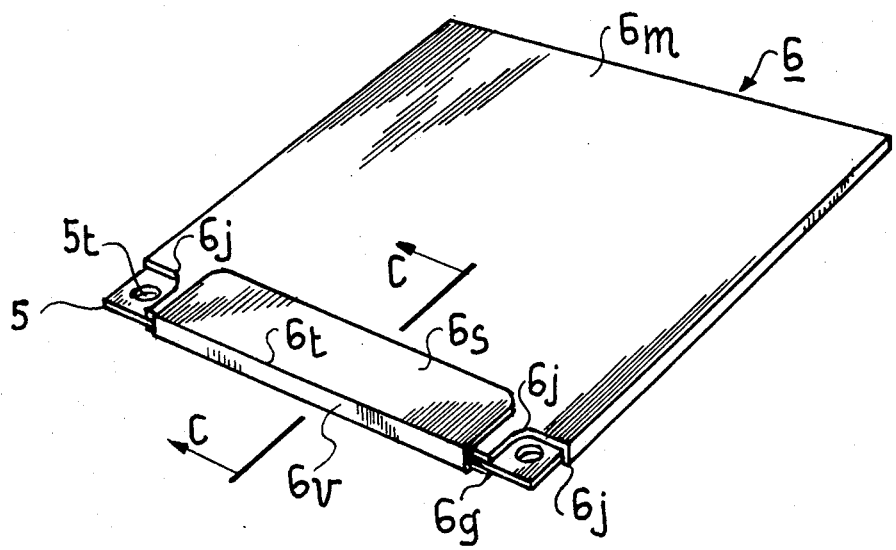
FIG_17
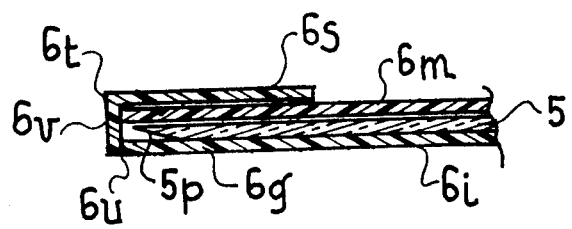
FIG_18

CONTAINER FOR VIDEO DISCS

The present invention relates to a container for video-discs which particularly comprises a support for the disc and a protective envelope which is open along one edge to enable the lateral insertion of the support into the envelope.

The word "container" in the description which follows is used in its widest sense and covers jackets and cassettes of all kinds which contain a support or sliding tray for a video-disc.

Video-discs are known to be subject to a certain number of adverse factors which in no case should be allowed to detract from the quality of the information recorded on the disc.

Thus, impalpable dust and traces of grease left by the fingers alter the refractive index of the microscopic grooves carrying the information.

Containers are known for example from U.S. Pat. No. 3,662,360 to Lambert, issued May 9, 1972, which consist of a tray with means for holding the disc centralised and of a protective casing.

Depending upon the use for which the video disc is intended, such containers are usually produced either in an expensive version from moulded materials or in a cheap version from flexible materials such as sheets of plastics or cardboard.

Containers made from moulded materials generally have a tray or support on which the disc is held central before it is inserted in the casing. However, as soon as the cassette has been closed and is being handled, the disc may come free from its support, which means that it is a matter of chance whether it is correctly centered or not, and this makes it necessary for the user to check and possibly correct its alignment at the time of transfering it to the playback device (turntable).

Containers made of flexible materials tend to hold the disc centralised in its seating as a result of the pressure exerted by the faces of the sleeve enclosing it. However, a disadvantage of this pressure is that it causes friction against the working face of the disc, and there is thus a danger of the disc being scratched or the microscopic grooves becoming clogged with very fine debris pulled from the material of the sleeve.

In addition, the care which is taken with the packaging for the sleeve and the raised embossment of the seating prevent the video-disc from being inserted in a magazine, which is an increasingly popular means of achieving large-scale public distribution.

The object of the present invention is to substantially reduce or overcome these disadvantages.

It is an object of the present invention to provide a container for video-discs which comprises:

guiding means to center the video-disc on the support, engaging means for handling the support and insertion means arranged at one end of the support for allowing it to be slid into and out of the envelope.

By virtue of this combination of means, it becomes possible for the video-disc to be held centered on the support no matter what the position of the holder and for the support to be inserted or with-drawn with extreme ease.

In a preferred embodiment of the invention, the guiding means are formed by the parallel lateral edges of the support, which slide against the small parallel internal faces of the envelope, the distance between the small faces being equal to the nominal outside diameter of the video-disc.

To cut down friction, the small parallel faces or the said edges may incorporate raised runners.

According to another embodiment of the invention, the guiding means are formed, on the one hand, by the raised surround of a seating arranged in the support, the diameter of which corresponds to the diameter of the video-disc and, on the other hand, by a stop inside the envelope which touches the periphery of the video-disc when the support is fully inserted in the envelope. In this case, the support and its seating are formed from a moulded plastics material.

In an advantageous embodiment of the invention, the guiding means are formed by the parallel lateral edges of the support, which slide in the parallel internal folds forming the boundaries of the envelope, and by a seating which can be folded in the support on the axis along which the support slides in the envelope.

In this embodiment, the seating may be produced by thermoforming at least two arcuate ribs in the thermoplastics material constituting the support. In this case, a sheet of treated paper is arranged over at least one of the large inner faces of the envelope in order to preserve the microgrooves from frictional damage against the envelope.

Depending upon the way in which the support is transferred, which may be manual, semi-automatic or automatic, the invention provides engaging means which are formed either by an opening or hole or by a shaped lug formed in or on the rear edge of the support.

The support is made easier to insert or withdraw by insertion means which consist of at least one lead-in which is formed by sloping or beveling the front edge of the support adjacent its two parallel lateral edges.

Other features and advantages of the invention will become apparent from the detailed description which follows.

In the accompanying drawings, which are given by way of example, are shown different embodiments which are intended to illustrate the invention, and in these drawings.

FIGS. 1 and 2 are respectively cross-sections from above and from the side of the holder according to the invention;

FIGS. 3 and 4 show details of FIGS. 1 and 2;

FIGS. 5 and 6 are plan and side views respectively of another embodiment of the support of FIGS. 1 to 4;

FIGS. 7 and 8 are plan and side views respectively of a modified embodiment of support made of a flexible material;

FIG. 9 shows an enlarged detail of the embodiment of FIGS. 7 and 8;

FIGS. 10 and 11 are plan and side views respectively of a modified embodiment of the envelope made of a flexible material;

FIG. 12 is an enlarged view of a detail of FIGS. 10 and 11;

FIG. 13 is a perspective view of a detail;

FIG. 14 is a schematic view in plan, partially in section of an embodiment of a flexible video disc container;

FIG. 15 is a section in elevation along AA of the container of FIG. 14;

FIG. 16 is a partial section along BB of a protective jacket of FIG. 14;

FIG. 17 is a perspective view of a fourth embodiment of the container; and

FIG. 18 is a partial section along CC of the container of FIG. 17.

In the embodiment shown in FIGS. 1 and 2, a holder 1 has an envelope or casing 2 and encloses a support 3 for a video-disc.

The support 3 is generally quadrilateral in shape. It has a rear edge 3a at right angles to the two parallel lateral edges 3b, 3c, and a front edge 3d which lies obliquely to these lateral edges. The front edge 3d and the edges 3b, 3c are linked by suitable connecting portions 3e and 3f to define at least one lead-in or tab 3q which facilitates the entry (or insertion) of the support 3 into the casing or envelope 2.

The support 3 contains a central opening or hole 3h, the function of which is to allow the handling of the disc, and a concentric depression or seating 3i intended to receive the video-disc.

The diameter of the seating 3i, details of which are seen in FIGS. 3 and 4, is such as to enable the outer circumference 4 of the video-disc to be received therein with an allowance for clearance. The depth of the seating 3i in the surface of support 3 is matched to the thickness of the disc, which is of the order of 200 microns.

The distance between the lateral edges 3b, 3c, of the support, i.e. its nominal width, is so calculated that these edges are tangent (FIG. 3) to the circumference 4 of the video-disc, which is shown as a dashed line. The same applies to the front edge 3d which is also tangential to the said circumference (FIG. 4). In practice, the tangency at these points allows for manufacturing tolerances.

The support 3 in FIGS. 1 to 4 is made from a moled plastics material. It therefore possesses a certain amount of rigidity. The dimensions below are given by way of example:

Thickness of the support at the periphery of the seating and up to the front edge = 2 mm;
Depth of the seating = approximately 1 mm;
Thickness of the elevation at the rear edge which fits into the casing = 5 mm.

The casing 2 (FIGS. 1 and 2) is a hollow rectangular parallelepiped of conventional form, which is open along one small side 2g to allow the support 3 to be inserted. It is preferably made from a moulded plastics material which gives it a satisfactory rigidity.

The small lateral parallel internal faces 2a, 2b serve as slideways for the edges 3b, 3c. However, to reduce frcition, the invention provides for raised runners 2c on the small faces 2a, 2b (FIGS. 1 to 3) or 3p, 3q on edges 3b, 3c (FIG. 5).

In the embodiment of FIGS. 1 and 2, the casing 2 contains an internal stop 2e integral with at least one 2f of the large (top or bottom) faces thereof. This stop 2e is arranged so as to arrest the front edge 3d of the support and to be tangential to the circumference 4 of the video-disc.

The embodiment of the support 3 shown in FIGS. 1 to 3 enables the circumference 4 of the video-disc to be self-aligning in the seating 3i as explained above. Also, when the support 3 is inserted in the casing 2 this ensures, on the one hand, the lateral alignment of the video-disc by means of the smaller, lateral faces 2a, 2b and, of the other hand, its longitudinal alignment (along the axis of sliding AA) between the stop 2e and the ridge 3j on the rear edge 3a (FIGS. 1 and 4). The ridge 3j on the rear edge 3a is matched to the opening 2g in the casing 2 to enable the opening to be sealed.

This embodiment allows the holder 1 to be orientated in any position whatever. In the least favourable position, that is to say when the holder is lying flat with the seating 3i facing downwards, which may occur during handling or storage, the disc drops out of the seating 3i under the influence of gravity but its circumference 4 remains tangential, except for the clearance, to the small faces 2a, 2b or the runners 2c, 2d and to the stop 2e and the ridge 3j. It suffices to turn the holder 1 over for the disc to resume its position in the seating 3i.

The embodiment in FIGS. 5 and 6 is more suitable in cases where the support 3 is handled by an automatic device. In this case, the two lead-ins 3q at the front edge 3d ensure symmetrical alignment about the axis of sliding AA. Alignment in the seating 3i takes place under the same conditions as in the previous embodiment.

In the embodiment shown in FIGS. 7 to 12, a holder 1 according to the invention has a support 5 for a video-disc and a flexible envelope 6.

The support 5 is generally quadrilateral in shape. It has a rear edge 5a which lies at right angles to the two parallel lateral edges 5b, 5c, and a front edge 5d which lies obliquely to the lateral edges. A lead-in 5q which is cut on the front edge 5d under the same conditions as the lead-in in FIG. 1 assists in the insertion of the support 5 into the envelope 6.

The support 5 also contains a central hole 5h and a concentric seating 5i intended to receive the video-disc (not shown). However, the invention makes provision for the material in the hole 5h to be ready for detachment but not to be actually detached until the time of use, in order to prevent the sharp edges of the hole from marking the video-disc for example in cases where the holder is inserted in a publication which when sent out is subject to numerous handling operations.

The seating 5i is formed by four arcuate ribs or embossments $5n$, of the same radius as the disc, symmetrically arranged on either side of axis AA. An enlarged cross-section through an embodiment of these ribs $5n$ is shown in FIG. 9.

The ribs are thermoformed in the actual material of the support 5, which may be a sheet of flexible plastics material such as polyvinyl chloride. The small radius of the ribs enables the circumference of the video-disc (shown in broken lines) to be accepted whilst allowing clearance to accommodate manufacturing tolerances.

The distance between the parallel lateral edges 5b, 5e, of the support i.e. its nominal width, is so calculated that these edges are tangential to the circumference of the video-disc under the same conditions as for the support 3 in FIGS. 1 and 5.

The envelope 6 (FIGS. 10 and 11) is formed by a substantially rectangular jacket which is open along one small side 6g to allow the support 5 to be inserted. It may be made from cardboard or a flexible plastics material.

The parallel internal folds 6a, 6b which determine the inside width of the envelope, serve to guide the lateral edges 5b, 5c of the support when it is sliding into the envelope.

In the embodiment in FIG. 10, the envelope 6 contains an internal stop 6e which is cut and folded in from at least one of the large faces. This stop 6e is so arranged as to arrest the front edge 5d and may also be made tangential to the circumference 4 of the video-disc in the same way as in the embodiments described above.

In this embodiment, the large (top and bottom) faces 6f of the envelope press gently against the video-disc and prevent it from escaping from the seating 5*i* whatever the position of the holder 1.

To prevent rubbing damage being caused to the microgrooves on the video-disc, it is advantageous to attach a sheet of treated paper or plastics 7 to the inside surface of at least the top face 6*f* of the envelope, facing the disc.

The symmetrical layout of the seating 5*i* on either side of the support axis AA and the flexibility of the envelope 6 allow folding along along this axis, which makes it possible for the container of holder to be bound into magazines and so on. For this purpose, the invention provides a lateral extension 6*h* (FIG. 10, shown in broken lines) parallel to the axis of sliding AA.

A shaped opening or hole 5*t* allows the support 5 to be transferred under the same conditions as support 3 (FIG. 1).

This embodiment is particularly useful for the large-scale public distribution of video-discs, which need to be of a reasonable price and easy to handle, without detracting from the quality of the recorded information.

In order to enable the support to be fitted to semi-automatic or automatic transfer means which form no part of the invention, the embodiment described above may incorporate one of the engaging means mentioned below.

In FIG. 1, the rear edge 3*a* contains a shaped hole 3*t* and in FIG. 5 this same edge carries a shaped lug 3*u*. In either case, a suitable latching member (not shown) may engage in the hole 3*t* or may take hold of the lug 3*u*.

The hole 3*t* is suitable for semi-automatic transfer while the lug 3*u* is satisfactory for automatic transfer.

Either of these different grasping means (the hole or lug) may be applied to the supports 3 and 5.

In the case of the embodiment of FIG. 7, the invention makes provision for a detachable rear edging 8*a* to be added to the support 5 as shown in FIG. 13. This edging 8*a* may for example be formed by a thin strip 8*b* which is provided with a longitudinal slot 8*c* which grips the edge 5*a*. Engaging means (not shown) similar to those in the previous embodiments may be provided in or on the strip 8*b*.

The embodiment in FIG. 13 enables the support 5, which is intended for manual transfer, to be adapted to semi-automatic or automatic transfer. This expedient of using a detachable edging 8*a* could be used with the embodiments in FIGS. 1 to 5 without affecting the features of the invention.

Cut-outs (not shown) are made at the opening 2*g*, 6*g* in the envelope to allow access to the engaging means which, in the present embodiment, are formed by a hole or a shaped lug.

FIGS. 14 and 15 represent respectively a partially cut-away plan view and an elevational cross-section along AA, of en embodiment of a container for a flexible disc, of the type described above in FIGS. 7 to 11. This embodiment is particularly suited to mechanized handling of the disc without manual contact with the latter.

In FIGS. 14 and 15, there is shown as 4, by broken lines, a flexible disc, such as a video disc, resting on a support 5, approximately plane and rectangular with a width equal to the width of disc 4. Support 5 is, for example, molded, pressed or laminated from plastic, such as polyvinyl chloride, polystyrene or polyethylene, to comprise centering projections or ribs (or impressions) 5*i* arranged as circular arcuate projections, concentrically in relation to circular opening 5*h* permitting the transfer of disc 4 to a rotation driving device (not shown). The arcuate projections 5*i* arc of a circle are contiguous with the cir of disc 4 so as to position central opening 4*a* of the latter concentrically with opening 5*h* of support 5, which presents a diameter greater than that of opening 4*a*.

Between front edge 5*a* and ribs 5*i* close to it, support 5 comprises further two openings 5*t* (FIG. 6) located symmetrically in relation to its longitudinal axis. These engagement or gripping openings 5*t* are intended to be engaged in hooking structures (not shown) such as studs or rods to obtain a correct and exact positioning of support 5 relative to the play back apparatus (not shown).

In FIGS. 14 and 15 is shown a protective jacket 6 in the form of a flat pouch, withdrawn from support 5 to disengage disc 4 to permit its transfer to a driving device. Support 5 is not entirely withdrawn from jacket 6 during reading of disc 4 and includes back edges 5*j* partly bevelled or rounded to facilitate insertion and centering of support 5 on the inside of jacket 6.

The front section 6*g* of pocket 6 is open and the lower wall 6*i* comprises clearances 6*j* leaving openings 5*t* of support 5 accessible for engagement of the latter in the reading device without handling.

Back edge 6*k* of jacket 6 is closed and can be obtained, for example, by making lower wall 6*i* and upper wall 6*m* of the latter from a single sheet of plastic folded on itself. The thickness of this sheet is advantageously selected to be less than 100 microns, preferably around 30 to 40 microns, to obtain a sufficient flexibility for inserting in a magazine and/or for retraction of the jacket by rolling up.

The width of jacket 6 is greater than that of support 5 to permit its positioning and fixing on the inside of the reading device independently of the latter. The side edges 6*n* of pocket 3 are respectively joined by means of spacing strips 6*p*, inserts or spacers, whose thickness is approximately equal to or slightly less than the over-all height (including ribs 5*i*) of support 5. Spacing strips 6*p* cam be made of plastic, preferably slightly more rigid, than that from which the sheet forming pockets 6*i* and 6*m* is made and they permit grasping of jacket 6 without preventing the sliding of support 5.

In a preferred embodiment of jacket 6, the part of spacing strips 6*p* close to the open front section 6*g* is replaced by rigid plates 5*q* of plastic or metal. Preferably, the parts stiffened by these plates 6*q* are used to grasp by pinching of jacket 6 in the reading device. The outside surfaces of the zones adjacent to rigid plates 6*q* are preferably provided with grooves 6*r* by milling to facilitate their hooking with clamps provided for this purpose.

In another embodiment, jacket 6 comprises on the upper face of its two side edges 6*n* bosses 6*z* with a width less than or equal to that of the inserted strips 6*p*, obtained by adding by gluing or fusing a block of plastic, or by pressing of edges 6*n* at the level of these strips. These bosses 6*z* are intended particularly to hold jacket 6 in a correct position during its insertion into a reading device (not shown).

The sheets forming walls 6*i* and 6*m* of jacket 6, and spacing strips 6*p*, can be made of plastic, such as polyvinyl chloride which permits hot fusion, polyethylene or polystyrene. By using different amounts of hardening material or plasticizer during fabrication, support 5 can be made to be more rigid than spacing strips 6*p* and the sheet forming walls 6*i* and 6*m*, to permit, for example, retraction of pocket 6 inside a reading device by folding or bending it along its width.

As in the embodiments above, the inside lateral faces 6a, 6b parallel with inserted strips 6p, delimit the available width in jacket 6, are used to guide the parallel lateral edges 5b, 5c of support 5 when it slides in the latter and comes into contact with the circumference of disc 4 to concur with the centering of the latter.

FIG. 16 shows a partial section along BB of pocket 6 of FIG. 14 to illustrate more in detail a preferred embodiment of the latter.

This jacket 6 is made to obtain an advantageous compromise between sufficient flexibility to permit retraction of the jacket inside a reading device during its withdrawal from support 5 by a rounded folding or rolling up and an adequate rigidity or holding for insertion of support 5 in jacket 6 to be performed easily and without damaging disc 4.

This is obtained, for example, by selecting sheets forming, respectively, upper wall 6m and lower wall 6i from materials and/or thicknesses that are different. Thus, it is possible to use a semirigid polyvinyl chloride for the upper sheet 6m opposite the disc which will assure, not being creasable, a better protection of disc 4 and for the lower sheet 6i a flexible polyvinyl chloride. The insert strips 6p joining lateral edges of sheets 6i and 6m also intervene in the longitudinal rigidity of jacket 6, the hardening additive or plasticizers will, therefore, be selected to obtain the desired flexibility of the unit.

FIGS. 17 and 18 respectively represent in perspective and in partial section along CC another embodiment of a container according to the invention which solves the problem posed by the permanent opening of front section 6g of jacket 6 by which support 5 with disc 4 could escape.

In this embodiment, closing of the opening section 6g is obtained by adding a flap 6s of a sheet of semirigid plastic, fused at 6u by one of its ends to lower sheet 6i of jacket 6 on the side of open section 6g. This flap 6s is arranged to leave open openings 5t permitting the handling of support 5 and aperture or clearance 6j of jacket 6.

This advantageous flap comprises a stiffened right-angle fold 6t which provides it a small side 6v blocking section 6g, and the end of this small side 6v is fused at 6v, to pivot, to lower sheet 6i, the pivot hinge being due to the flexibility of the latter, for example.

To facilitate pivoting of flap 6s by the sliding of support 5, the front edge (5a, FIG. 1) of the latter is cut at a bevel to rest on the small side 6v of flap 6s as far as possible from the hinge at 6u to create a couple when support 5 is hooked with openings 5t and a pull is exerted on the latter.

The other end of flap 6s can be connected in a removable way to upper sheet 6m with a strip of fabric or plastic that is adhesive or magnetic to assure closing of jacket 6.

Closing of jacket 6 can also be assured with one or more pressure buttons (not shown) whose male and female components are respectively fastened to flap 6s and upper sheet 6m. Further, it is possible to perform the closing with only the male parts of these buttons made to be inserted in engagement openings 5t of support 5.

What is claimed is:

1. A container for retaining, protecting and for allowing the handling without manual contact of a flexible video-disc having a circular central opening for its transfer and its driving in rotation, said container including a substantially rectangular protecting envelope jacket having one of its edges open and three others closed and a substantially flat, quadrilateral, tray-shaped supporting plate slideably displaceable within said envelope for carrying said video-disc; said supporting plate including, at its rear, engaging means for allowing its mechanical handling to and from the envelope, at its front, means for facilitating its insertion and positioning inside said envelope, a central opening greater than that of said disc for allowing the transfer thereof and, on one of its sides, a plurality of arcuate, normally orientated projections, concentric with said central opening for providing a circular hollow seating closely surrounding the circumference of the disc when centered, said envelope including a stop projecting from and integral with at least one of its inner walls, and means for centering the disc on said plate, wherein the improvement comprises that the width of said supporting plate and the distance between at least a portion of the inner walls of the parallel lateral closed edges of the envelope are made to be substantially equal to the diameter of the disc and that the stop projecting inside said envelope is positioned to come into contact with the circumference of the disc and the front of the supporting plate when it is entirely inserted inside the envelope, whereby the inside of lateral edges and the stop of the envelope cooperate to position said disc with its central opening concentrical with that of said support whatever the orientation of the container.

2. Container as claimed in claim 1, wherein said envelope and said supporting plate are made of a flexible material and said arcuate projections providing the seating are interrupted so as to render said container foldable along an axis parallel to the direction of displacement of the plate inside the envelope.

3. Container as claimed in claim 2, wherein at least a sheet of soft material is fixed to the internal face of the envelope facing the disc for preserving the grooves carrying the recording from frictional damage.

4. Container as claimed in claim 2, wherein said engaging means include at least one hole situated adjacent the rear edge of the support and at least one clearance situated adjacent the front edge of at least the lower wall of said envelope for exposing said hole.

5. Container as claimed in claim 4, wherein said means for facilitating the insertion and positioning of said supporting plate inside said envelope include a gradual increase of the width of the supporting plate at its transition between its front edge and its parallel lateral edges.

6. Container as claimed in claim 1, wherein the outer width of the envelope exceeds the widths of both its frontal opening and the supporting plate, whereby to create on said envelope two lateral margins along which the upper and lower walls of the envelope are joined together, for engaging said envelope independently of said supporting plate.

7. Container as claimed in claim 6, wherein the envelope further includes a right angle flap for closing its open edge, said flap having a small side whose free end is pivotably joined to the front edge of the lower wall of the envelope.

8. Container as claimed in claim 6, wherein said upper and lower envelope walls are respectively made of two plastic materials having different flexibilities for facilitating the rolling up of the envelope in a crosswise direction as well as the reinsertion of said supporting plate into said envelope.

* * * * *